(12) United States Patent
Power et al.

(10) Patent No.: US 8,230,324 B1
(45) Date of Patent: Jul. 24, 2012

(54) AD SIZE CAPTURE TOOL FOR PUBLICATIONS

(75) Inventors: Ted Power, Brooklyn, NY (US); Ryan Rennaker, Palo Alto, CA (US); Jan M. Zankowski, London (GB)

(73) Assignee: Google Inc., Mountain View, CA (US)

( * ) Notice: Subject to any disclaimer, the term of this patent is extended or adjusted under 35 U.S.C. 154(b) by 980 days.

(21) Appl. No.: 12/212,503

(22) Filed: Sep. 17, 2008

Related U.S. Application Data

(60) Provisional application No. 60/973,145, filed on Sep. 17, 2007.

(51) Int. Cl.
*G06F 17/00* (2006.01)
(52) U.S. Cl. ...................................................... 715/227
(58) Field of Classification Search .................... 715/227
See application file for complete search history.

(56) References Cited

U.S. PATENT DOCUMENTS

| | | | |
|---|---|---|---|
| 6,167,382 A | 12/2000 | Sparks et al. | |
| 6,446,045 B1 | 9/2002 | Stone et al. | |
| 6,829,587 B2 | 12/2004 | Stone et al. | |
| 6,882,439 B2* | 4/2005 | Ishijima | 358/1.15 |
| 6,985,882 B1 | 1/2006 | Del Sesto | |
| 7,240,025 B2 | 7/2007 | Stone et al. | |
| 7,249,059 B2 | 7/2007 | Dean et al. | |
| 2006/0026067 A1* | 2/2006 | Nicholas et al. | 705/14 |
| 2006/0111970 A1* | 5/2006 | Hill et al. | 705/14 |
| 2008/0162277 A1* | 7/2008 | Moonka et al. | 705/14 |

FOREIGN PATENT DOCUMENTS

WO WO97/21183 6/1997

OTHER PUBLICATIONS

Claussen, et al., "Selling Newspaper Advertising on the Web: A field Test of the Newspaper Advertising Website" Proceedings of the Conference American Academy of Advertising, 1999, pp. 207-215.*
Trappey et al., "Global content management services for product providers and purchasers", Computers in Industry 53, 2004, p. 39-58.*
Zeff et al. *Advertising on the Internet*, 2d edition, Robert Ipsen, 1999 (454 pp).
Picture8.png screenshot, [online] http://www.corp.google.com/-tedp/projects/printPub/signUp/—retrieved from client to attorney e-Mail sent on Sep. 13, 2007 at 3:54 PM, 1 page.
*Ad Force User Guide, A Complete Guide to AdForce*. Version 2.6, AdForce, Inc. 1998, 285 pages.
*AdManagerPro Adminstrator's Manual*, Version 2.0, Baseview Harris. 1998, 226 pages.

(Continued)

*Primary Examiner* — Amelia Rutledge
(74) *Attorney, Agent, or Firm* — Fish & Richardson P.C.

(57) ABSTRACT

Methods, systems, and apparatus for specifying the size of one or more advertisements that can be accepted for inclusion in a publication. In one aspect, a method includes receiving one or more parameters defining a publication, wherein the one or more parameters include one or more of a format, a number of columns, a height and a width; presenting an advertisement inventory table corresponding to the publication, wherein the advertisement inventory table is generated in accordance with the one or more received parameters; receiving input through the advertisement inventory table identifying at least one supported advertisement; and storing, in association with the publication, information defining the at least one supported advertisement.

23 Claims, 6 Drawing Sheets

OTHER PUBLICATIONS

ClassManagerPro Administration and Receivables Manual, Administrator's Manual, Version, 1.0.5, Baseview Products, Inc. Feb. 1, 1997, 157 pages.

[online], Ad-Star, retrieved from http://web.archive.org/web/19970412171433/www.adstar.com/about.html [retrieved on Apr. 12, 1997 & Feb. 1, 1997], 42 pages.

AdForce, Inc. S-1/A SEC Filing, May 6, 1999, 74 pages.

Reexam of U.S. Patent No. 6,829,587 B2 (*Function Media, LLC* v. *Google Inc.*, US for the E. District of TX, Marshall Div., Civil Action No. 2:07-CV-279), Jul. 14, 2008, 89 pages.

\* cited by examiner

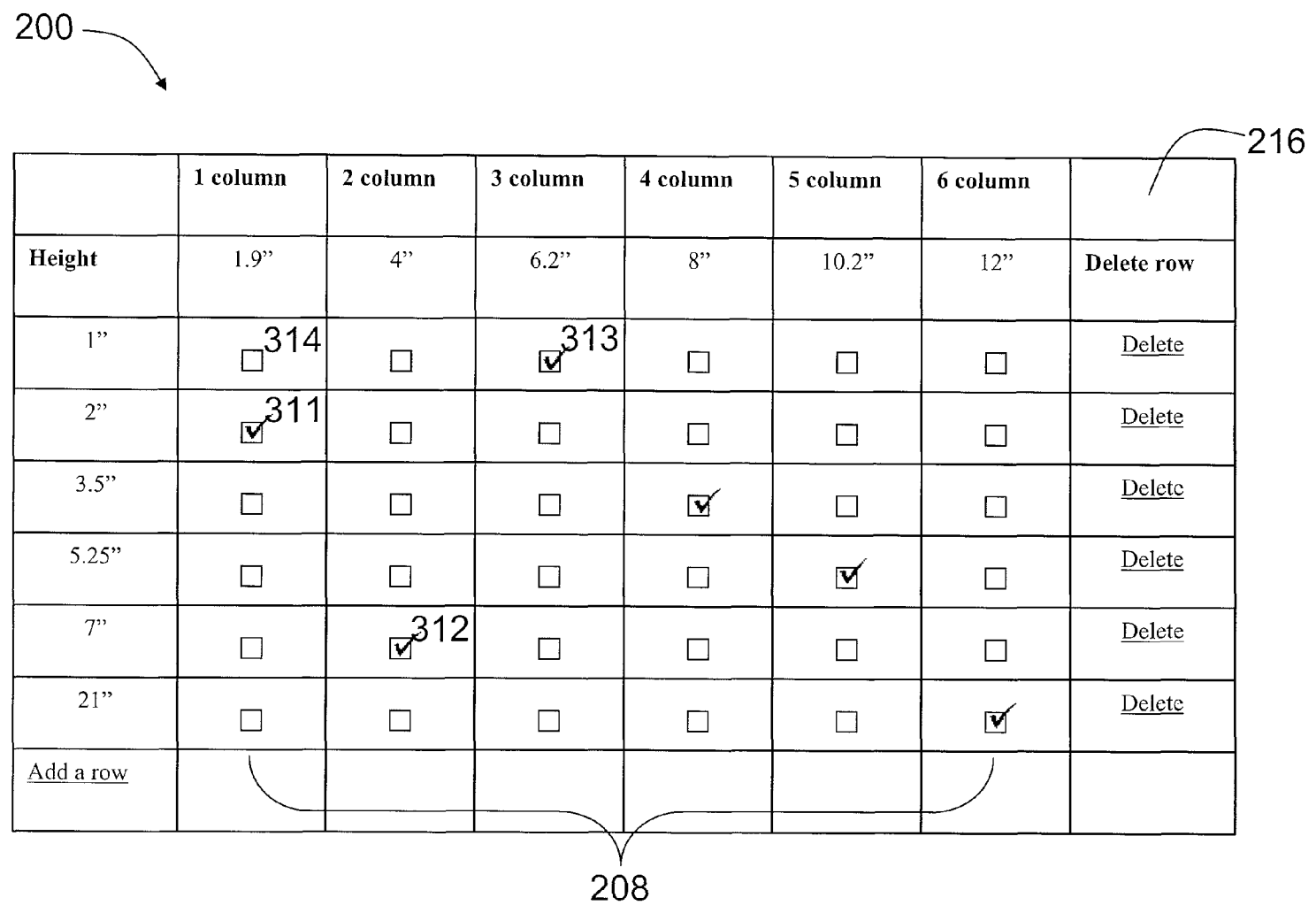

| Height | 1 column | 2 column | 3 column | 4 column | 5 column | 6 column | |
|---|---|---|---|---|---|---|---|
| | | | | | | | Delete row |
| 1" | 1.9" | 4" | 6.2" | 8" | 10.2" | 12" | |
| 2" | ☐ 314 | ☐ | ☑ 313 | ☐ | ☐ | ☐ | Delete |
| 3.5" | ☑ 311 | ☐ | ☐ | ☐ | ☐ | ☐ | Delete |
| 5.25" | ☐ | ☐ | ☐ | ☑ | ☐ | ☐ | Delete |
| 7" | ☐ | ☑ 312 | ☐ | ☐ | ☑ | ☐ | Delete |
| 21" | ☐ | ☐ | ☐ | ☐ | ☐ | ☑ | Delete |
| Add a row | | | | | | | |

FIG. 3

AD SIZE CAPTURE TOOL FOR PUBLICATIONS

This application claims priority to U.S. Provisional Patent Application Ser. No. 60/973,145 filed on Sep. 17, 2007, entitled "Ad Size Capture Tool for Newspapers." The disclosure of the prior application is considered part of, and is incorporated by reference in, the disclosure of this application.

TECHNICAL FIELD

The following disclosure relates to computer-implemented systems and techniques for specifying the size of one or more advertisements that can be accepted by a publisher for inclusion in a publication, including a printed publication.

BACKGROUND

Advertisers can submit advertising copy (or "ad copy") to a publisher for inclusion in a printed publication directly or through a third-party, such as a designer. Typically, the ad copy can be provided in the form of a proof, which presents the advertisement using the format in which the advertisement should be run. The proof can be in hard copy form or electronic form. The publisher can then manually process the proof to incorporate it into the printed publication.

An advertiser typically also specifies the placement of the ad copy in the printed publication, including parameters such as the edition in which the ad copy is to appear, the page on which the ad copy is to run, and the size of the advertisement. An advertiser can submit the ad copy simultaneously with specifying the placement of the ad copy in the printed publication. If the ad copy supplied by the advertiser fails to satisfy one or more threshold criteria, the ad copy may not be included in the desired printed publication. Further, manual processing of the ad copy can delay notification to the advertiser that a piece of ad copy fails to satisfy one or more criteria.

An advertiser seeking to place an advertisement can determine what advertising space is available for a particular edition of a printed publication. Typically, the advertiser can interact with the publisher to determine the format of the printed publication and the advertisement sizes available. For example, the size of an advertisement can be expressed using a number of parameters, including the height, width, and number of columns. The available advertising space can change between editions and also between sections of a single edition.

Once made, an offer to purchase advertising space in a printed publication is evaluated by the publisher to determine whether the ad copy will be accepted. Historically, advertisers negotiated terms directly with the publisher, such as through a sales representative. For example, a publisher could provide standard rates and terms for a particular publication. If an advertiser accepted those terms, the ad copy would be placed in the printed publication. Further, a publisher could offer special terms or preferential pricing, such as for volume customers and new advertisers. Generally, the applicable rates and terms were provided to advertisers upon request.

SUMMARY

An advertising ("ad") system can be configured to allow a publisher to specify the various advertisement sizes that can be accepted for a publication. The advertising system can be implemented as an online, e.g., web-based, ad size specifying tool that presents a user interface for capturing one or more ad size parameters.

The present inventors recognized the need to develop a system to permit entering, in an electronic form, one or more ad size parameters corresponding to ads supported by a publisher, including a print media publisher. The system, among other implementations, can be implemented to include a user interface that enables input of parameters describing a publication or a portion of a publication, including page size, number of columns on a page, column width, and advertisement height. The system can be used to capture and store advertisement sizes that one or more publications can accept.

In one aspect a computer-implemented method of receiving information describing advertisements supported by a publication includes receiving one or more parameters defining a publication. The one or more parameters defining the publication include one or more of a format, a number of columns, a height, and a width. An advertisement inventory table corresponding to the publication is presented. The advertisement inventory table is generated in accordance with the one or more received parameters. Input through the advertisement inventory table identifying at least one supported advertisement is received. Information defining the at least one supported advertisement in association with the publication is stored.

This and other aspects can include one or more of the following features. The one or more parameters defining the publication can include one or more of a format, a number of columns, a height, and a width. Receiving input through the advertisement inventory table can further include receiving input specifying a height of the at least one supported advertisement. Receiving input through the advertisement inventory table can further include receiving input specifying a number of columns of the at least one supported advertisement. The advertisement inventory table can further include at least one column specifying an advertisement width and at least one row specifying an advertisement height. Each column of the advertisement inventory table can receive input specifying a corresponding advertisement width. Each row of the advertisement inventory table can receive input specifying a corresponding advertisement height. Receiving input through the advertisement inventory table can further include receiving input selecting a row-column pair of the advertisement inventory table. Receiving input selecting a row-column pair can further include receiving input through a checkbox, a data entry field, a radio button, a pre-populated drop-down menu, or a slider.

The techniques described in this specification can be implemented to realize one or more of the following potential advantages. For example, the techniques can be implemented to include enabling a publisher to specify available ad inventory for one or more publications. In addition, the techniques can be implemented to include one or more user interfaces that graphically depict the sizes of ads that can be accepted by a publication. Moreover, the techniques can be implemented such that through a single user interface a publisher can amend and reconfigure the acceptable advertisement sizes for a particular publication.

The techniques also can be implemented to present to an advertiser a comprehensive listing of ad sizes available in a publication. Further, the techniques can be implemented to specify ad inventory for individual sections of a publication. For example, the techniques can be implemented to differentiate ad inventory available for a sports section from ad inventory available for a finance section. The techniques also can be implemented to generate a database of available ad inventory for one or more publications. Furthermore, the techniques can be implemented to store the database of available ad inventory for one or more publications.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

FIG. 3 shows an exemplary ad space user interface describing ad sizes that a publication can accept.

Like reference symbols indicate like elements throughout the specification and drawings.

DETAILED DESCRIPTION

Figure 1:
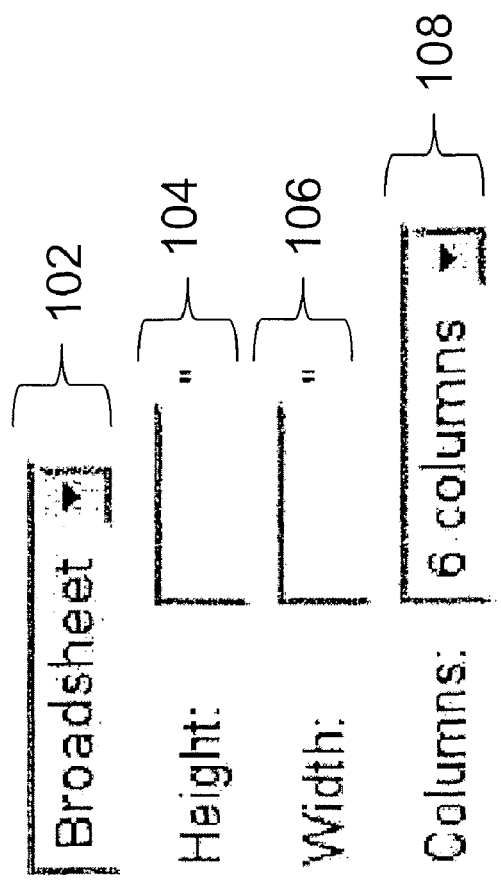
FIG. 1 shows an exemplary user interface configured to receive input describing the printable area of a publication.

FIG. 1 shows an exemplary user interface configured to receive input describing the printable (or displayable) area of a publication. The publication can be a printed publication, such as a newspaper or a magazine. Alternatively, the publication can be an electronic publication with a displayable area. In some implementations, a user, e.g., a publisher, can be presented with a publication user interface 100, which can include one or more prompts for receiving information relating to the printable area of a publication. In some implementations, the publication user interface 100 prompts can include one or more drop-down menus with pre-populated values. For example, a publisher can specify the format of a publication by selecting a pre-populated value from a format drop-down menu 102. The format drop-down menu 102 can include one or more format values, including broadsheet, tabloid, Berliner, midi and compact, among other such publication styles. In some other implementations, the publisher can respond to prompts by interacting with one or more other data entry tools, such as fields, radio buttons, checkboxes, sliders, or other such graphical user interface widgets. For example, a data entry field included in the publication user interface 100 can be implemented to receive any value. Alternatively, a data entry field can be constrained to receiving a value within a predetermined range or subset of values.

The publication user interface 100 also can include one or more prompts corresponding to the dimensions of the publication. In some implementations, the one or more dimensions also can be associated with the particular format specified. For example, when "Broadsheet" is specified as the format, the publication user interface 100 can include a height prompt 104 and a width prompt 106. Further, a drop down menu associated with the height prompt 104 and with the width prompt 106 can include one or more standard values, such as values associated with the selected format. In some other implementations, the publication user interface 100 can receive values through one or more graphical user interface widgets, such as a data entry field. The publication user interface 100 also can include a column prompt 108 corresponding to the number of columns of the publication.

Figure 2:
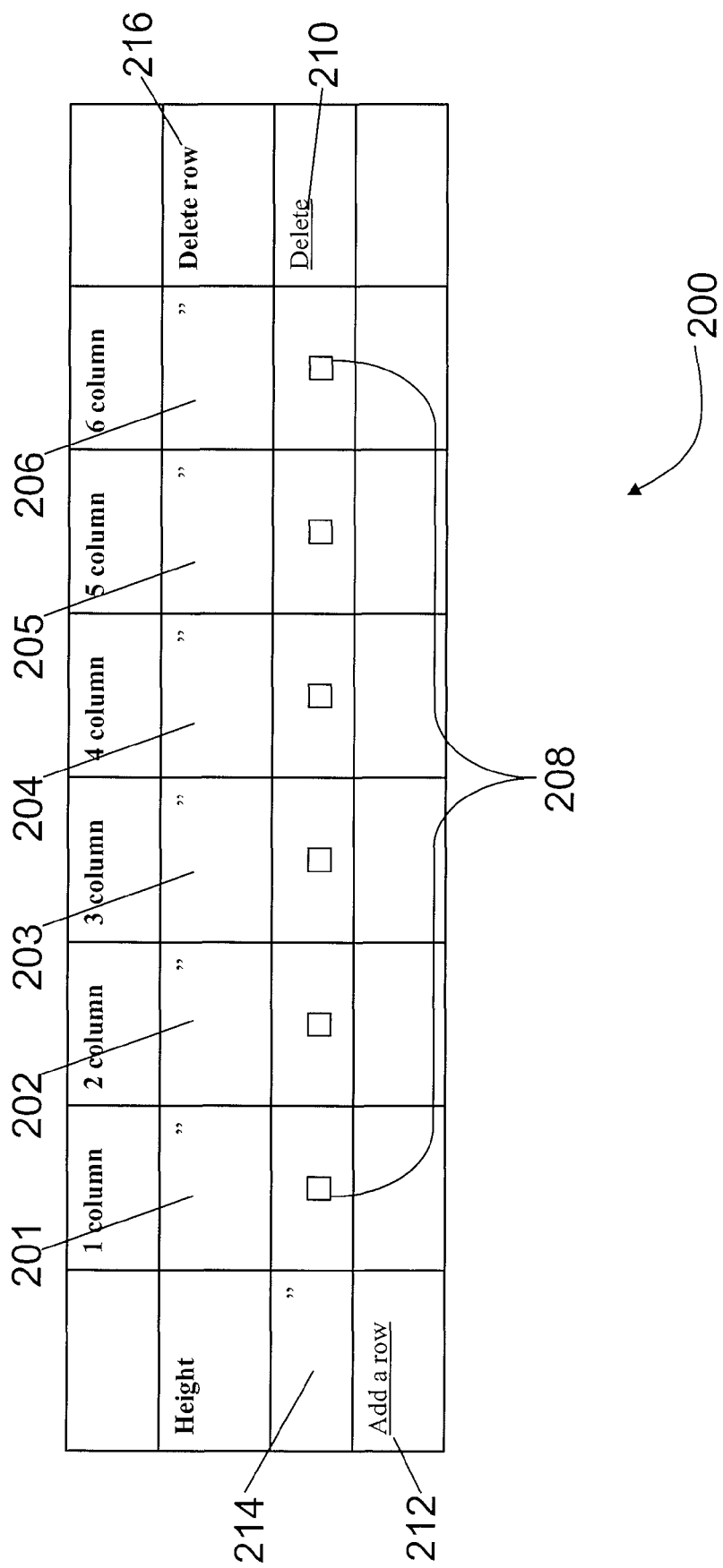
FIG. 2 shows an exemplary ad space user interface configured to receive input describing the ad space dimensions of a publication.

FIG. 2 shows an exemplary ad space user interface 200 configured to receive input describing the ad space dimensions of a publication. The format of the ad space user interface 200, including the type and amount of information to be received, can vary depending on the information received in the publication user interface 100. For example, in response to receiving in the publication user interface 100 information indicating that a publication has six columns, the ad space user interface 200 can include an ad inventory table 216 that has six columns. Further, each column in the ad inventory table 216 can have an associated data entry field, such as column width fields 201-206, that can be used for specifying column width. Thus, column width can be represented in a number of columns in the publication. Each column can define the width of an advertisement. The width of an advertisement can be expressed in a number of columns in an advertisement inventory table, like ad inventory table 216. Additionally, the width of an advertisement can be expressed in a unit of measurement, such as inches or centimeters. In some implementations, the dimensions of an electronic publication can be entered according to a unit of measurement such as a number of pixels. For example, a publisher can indicate that an electronic publication can accept advertisements having a resolution of 640×480 pixels. Furthermore, the dimensions of an electronic publication can be automatically converted upon the selection of a different pixel resolution display.

The ad inventory table 216 can be populated with information describing the width of each column in the column width fields 201-206 according to the layout of the corresponding publication. For example, the width of a first column can be entered in data entry field 201, such as by typing or selecting a value representing the column width. Further, for each subsequent column, the total width of that column and each preceding column can be entered in the respective associated data entry field. For example, a value specifying the combined width of two columns can be entered into data entry field 202. Entering a value into data entry field 202 does not necessarily require that the corresponding advertisement be included in the first two columns of the publication; the value entered indicates that an advertisement is two columns wide and that the advertisement can be included in any two columns of the publication. In some other implementations, the column width fields 201-206 (and all other data entry fields associated with the disclosure) can be implemented using one or more other graphical user interface widgets.

In some implementations, the ad space user interface 200 can include interactive buttons, or other such graphic user interface widgets, for automatically populating the column widths of the ad inventory table 216 according to a publisher defined function. For example, the publisher defined function can be the value of column width field 201 multiplied by the column. Thus, if the publisher enters a column width of 2-inches in column width field 201, the column width of column width field 202 will be 4-inches, the column width of column width field 203 will be 6-inches, and so on.

Additionally, in some implementations, one or more verification operations can be performed to validate data entered into the ad space user interface 200. For example, an operation can be performed to verify that a dimension corresponding to column width increases for each additional column added. Thus, if a width of 6 inches is entered for one column, it can be verified that the width for two columns exceeds 6 inches. Another operation can be performed to verify that the column height and width dimensions, individually and/or collectively, do not exceed the corresponding dimensions of the publication.

One or more additional rows can be added to the ad space user interface 200 by selecting an add row link 212. Each row of the ad space user interface 200 can correspond to a different advertisement height, as specified by the user in ad height field 214, that the publication is implemented to accept. Further, each row can be deleted from the ad inventory table 216 by selecting, e.g., clicking on, a delete row link 210. The ad space user interface 200 can specify all of the advertisement sizes that can be accepted in the publication—collectively referred to as the publication's "ad inventory."

The ad space user interface 200 can be implemented to include one or more checkboxes 208 in the ad inventory table 216 which can be selectively selected. Each row of the ad inventory table 216 can have a checkbox that corresponds to each column of the publication. Each of the checkboxes 208 in the ad inventory table 216 can be checked to indicate that a particular column supports a particular advertisement height. Checking one or more of the checkboxes 208 can indicate that the publication can facilitate the advertisement height corresponding to the particular column and row in which the checkbox 208 is checked. In some other implementations, interacting with one or more data entry fields, radio buttons, checkboxes, sliders or other such graphical user interface widgets also can indicate that a particular column supports a particular advertisement.

FIG. 3 shows an exemplary ad space user interface 200 identifying ad sizes that a publication can accept. In the ad space user interface 200, the ad inventory table 216 has been selectively populated with information describing the publication's ad inventory. The ad inventory table 216 can include six columns based in response to receiving in the publication user interface 100 information indicating that a publication has six columns. The six columns can span various portions of a page of a publication and can represent a single column or a full page width, or any column width in between.

In order to specify the ad inventory associated with the publication, each checkbox 208 corresponding to a particular ad size can be selectively checked to indicate that the publication accepts ads of that size. For example, the publication, as shown by checkbox 311 in FIG. 3, can accept an ad height of 2-inches and a column width of 1.9-inches. Additionally, as shown by checkbox 312, the publication can accept an ad height of 7-inches and a column width of 4-inches spanning the width of two columns. In further illustration, as shown by checkbox 313, the publication can accept an ad height of 1-inch and a column width of 6.2-inches spanning the width of three columns. Each checkbox 208 also can be selectively unchecked to indicate that the publication does not accept ads of that corresponding height and column width. For example, the publication cannot accept an ad height of 1-inch and a column width of 1.9-inches because checkbox 314 corresponding to an ad height of 1-inch and a column width of 1.9-inches is unchecked.

Figure 4:
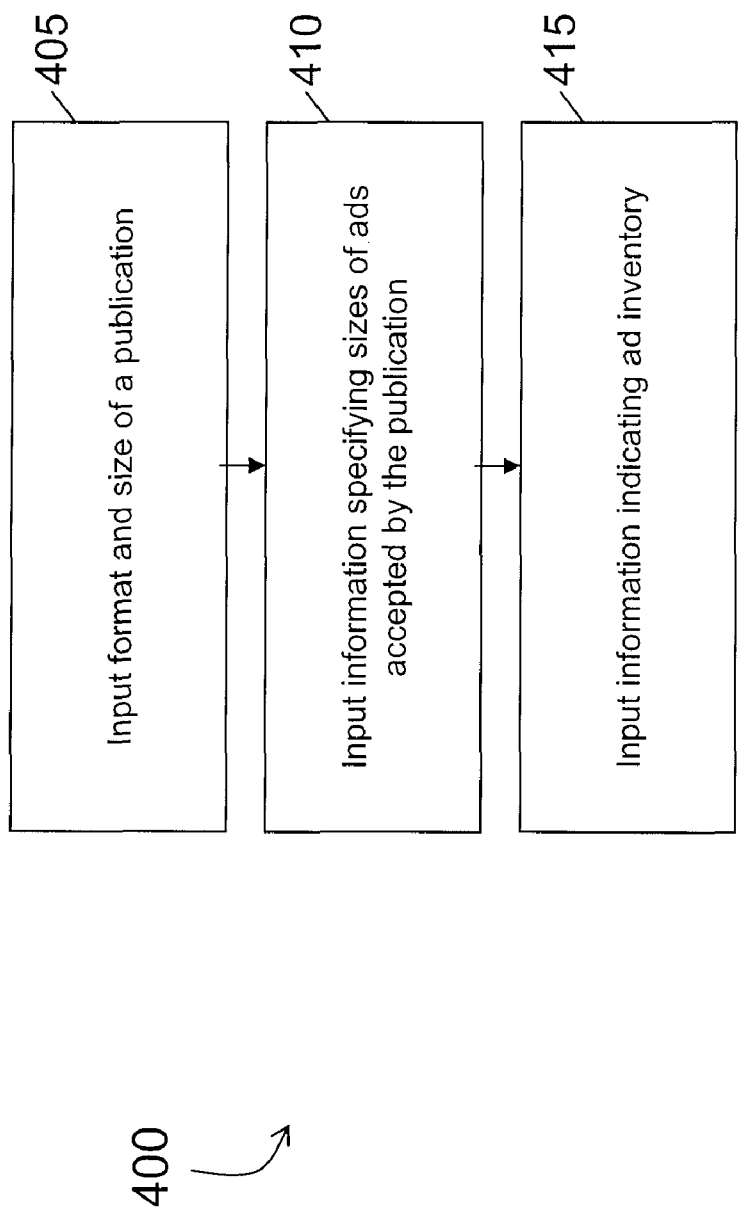
FIG. 4 shows a flow diagram describing an exemplary data input process for capturing printable publication data.

FIG. 4 shows a flow diagram describing an exemplary data input process 400 for capturing printable publication data. The data input process 400 can, for example, be implemented in the publication user interface 100 of FIG. 1 and the ad space user interface 200 of FIGS. 2 and 3.

A publisher, such as a print media publisher, can input the format and size of a publication (405). For example, the format can be one of broadsheet, tabloid, Berliner, midi, or compact, among other such publication styles. Further, the physical dimensions, or the size, of the publication also can be specified, including the height and width. Moreover, depending on the format of the publication, a number of columns also can be specified. In some implementations, the number of pages of the publication can be specified. In some implementations, individual sections of the publication also can be specified. For example, the individual sections of the publication can include world news, business, sports, or classifieds, among other such publication sections.

The publisher also can input information specifying the size of ads that can be accepted by the publication (410). Ad size can be expressed by the width of one or more columns and the height of an advertisement, with the dimensions expressed in a unit of measure, such as inches or centimeters. In electronic publications, ad size can be expressed in a unit of measure, such as a number of pixels. In some implementations, ad size can be automatically converted from inches to pixels, and vice versa. The information specifying the size of ads that can be accepted by the publication can be input using one or more drop-down menus with pre-populated options. For example, a pre-populated option can be selected from the drop-down menu corresponding to a width of one or more columns and a height of an advertisement. An input device, e.g., a mouse, operatively coupled to a computer system in which a publication user interface is installed can be used to select a pre-populated option from the drop-down menu corresponding to a width of one or more columns and a height of an advertisement. Alternatively, a keyboard can be used to select a pre-populated option from the drop-down menu. Moreover, a touchscreen also can be used to select a pre-populated option from the drop-down menu.

Additionally, the information specifying the size of ads that can be accepted by a publication can be input into an ad inventory table, where column width and advertisement height can be implemented as the ad inventory table's axes. For example, the ad inventory table can include one or more binary user interface abstractions, e.g., checkboxes, corresponding to each column-width/advertisement-height pairing which can be selected by an input device, e.g., a mouse, to specify the size of ads that can be accepted by a publication. In some other implementations, the information specifying the size of ads that can be accepted by the publication can be input into the ad inventory table using one or more other data entry tools, such as fields, radio buttons, sliders, or other such graphical user interface widgets.

Further, the publisher can alter the parameters of the ad inventory table by adding and/or deleting rows associated with the height of an advertisement. For example, the publisher can interact with, e.g., click on, a special purpose link or function button to add a row to the ad inventory table. Each row of the ad inventory table can correspond to a different advertisement height that can be accepted in a publication. Additionally, the publisher can interact with a special purpose link or function button to delete a row from the ad inventory table.

The publisher also can selectively input information indicating ad inventory (415). The publisher can selectively populate an ad inventory table to indicate the one or more ad sizes that can be accepted in a publication. For example, checkboxes corresponding to a column width and advertisement height can be selected by an input device, such as a mouse, or keyboard, or by interacting with a touchscreen, to specify the size of ads that can be accepted by the publication. Selecting, or leaving blank, each individual checkbox of the ad inventory table can indicate which width and height dimensions of advertisements can be accepted in the publication. In some other implementations, other graphical user interface widgets can be used to indicate the ad inventory in place of checkboxes, including one or more other data entry tools, such as fields, radio buttons, or sliders, among other ad inventory indicators.

Figure 5:
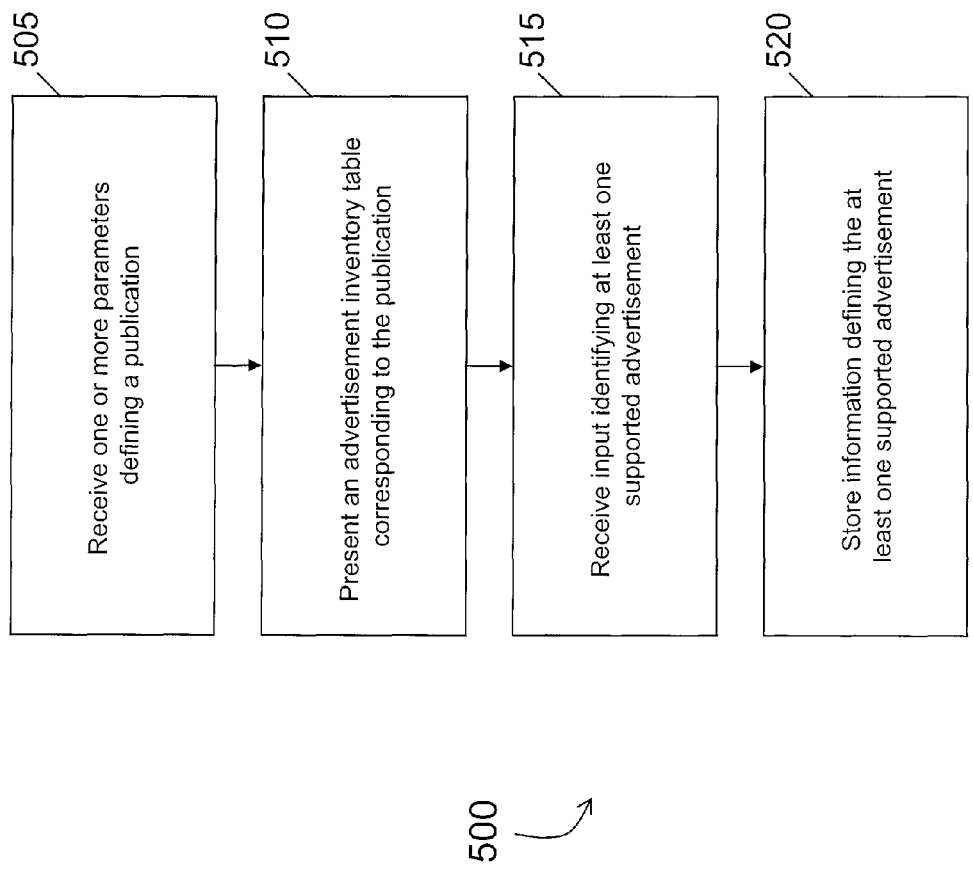
FIG. 5 shows a flow diagram describing an exemplary data input process for receiving information describing advertisement sizes supported by a publication.

FIG. 5 shows a flow diagram describing an exemplary data input process 500 for receiving information describing advertisement sizes supported by a publication. The data input process 500 can, for example, be implemented in the publication user interface 100 of FIG. 1 and the ad space user interface 200 of FIGS. 2 and 3.

Receive one or more parameters defining a publication (505). The one or more parameters can include one or more of a publication format, a number of columns, a height, and a width. A publisher can input the one or more parameters in, e.g., a publication user interface provided by a software application operatively coupled to a computer system on which the software application is installed. Alternatively, the publisher can input the one or more parameters in a web-based publication user interface accessible through a communication network. The publication user interface can include one or more drop-down menus with pre-populated options. In some other implementations, the publication user interface can include one or more data entry tools, such as fields, radio buttons, checkboxes, sliders, or other such graphical user interface widgets.

Further, a publisher can be presented with a section user interface, which includes prompts for the user to specify information relating to individual sections of a publication for which an advertisement can be accepted. For example, the section user interface can include one or more prompts corresponding to individual sections of a publication that can be implemented to receive advertisements. Individual sections of the publication can include sports, finance, lifestyle or classifieds, among other such publication sections. The section user interface prompts can include one or more drop-down menus with pre-populated options. In some other implementations, the publisher can respond to prompts by interacting with one or more data entry tools, such as fields, radio buttons, checkboxes, sliders, or other such graphical user interface widgets. Upon specifying the sections of the publication configured to receive advertisements, a user can be prompted to specify ad size inventory for each section of the publication. One or more advertisement inventory tables can be configured to receive ad size inventory for each section, respectively. For example, ad size inventory for a sports section can be received in a sports advertisement inventory table, whereas ad size inventory for a finance section can be received in a finance advertisement inventory table.

Present an advertisement inventory table corresponding to the publication (510). The advertisement inventory table can be generated in accordance with one or more of the received parameters defining the publication. In addition, multiple advertisement inventory tables can be presented. The advertisement inventory table can include a number of columns, rows, delete links, and an adding link. The number of columns can correspond to the one or more of the received parameters defining the publication. Each column can include a particular column width. The aggregate of the column widths can constitute the width of one or more pages of a publication. Each row can correspond to an advertisement height supported in the publication. Each row can include a delete link that can be interacted with, e.g., by clicking on, to delete rows of the advertisement inventory table. Conversely, the adding link can correspond to generating additional rows of the advertisement inventory table. As many rows as are needed to support the various ad sizes that the publication can accept can be generated in the advertisement inventory table.

Receive input identifying at least one supported advertisement (515). Information identifying at least one supported advertisement can be input in the advertisement inventory table. The information identifying at least one supported advertisement can include a width of one or more columns and a height of one or more advertisements. The information identifying at least one supported advertisement that can be accepted by a publication can be input using one or more drop-down menus with pre-populated options. For example, a pre-populated option can be selected from a drop-down menu corresponding to a column width for each of the number of columns. An input device, e.g., a mouse, operatively coupled to a computer system with a display in which the advertisement inventory table is presented can be used to select a pre-populated option from the drop-down menu corresponding to a column width. Alternatively, a keyboard can be used to select a pre-populated option from the drop-down menu. Moreover, a touchscreen can be interacted with to select a pre-populated option from the drop-down menu.

The width of the number of columns can depend upon the one or more parameters defining the publication. Column widths can be input in an advertisement inventory table. For example, a width of a first column can be input in the advertisement inventory table under a first column heading and a width of a second column can be input in the advertisement inventory table under a second column heading. Alternatively, the combined width of the first and the second columns can be input in the advertisement inventory table under the second column. Although the width of a two-column advertisement can be input in the second column of the advertisement inventory table, the advertisement itself need not be included in the first two columns of the publication. For example, in a six-column publication, a two-column advertisement can be presented in the first two columns, or the second and third column, or the third and fourth column, and so on. An advertisement height for each row in the advertisement inventory table also can be specified. Advertisement heights can be specified in the advertisement inventory table by interacting with an input device, such as a mouse, a keyboard or with a touchscreen. Advertisement heights can be implemented to correspond to the heights of advertisements that can be accepted in the publication. The advertisement height for each row can depend upon the one or more input parameters defining the publication.

Each of the one or more columns that can support a particular advertisement height also can be specified. A binary user interface abstraction associated with each column-row pair can be selected to specify which column supports a particular advertisement height. For example, a checkbox associated with a first column width of, e.g., 1.9-inches and a row advertisement height of, e.g., 1-inch can be selected to indicate that a publication accepts 1-inch advertisements having a width of 1.9-inches. Other checkboxes associated with other column widths and other row advertisement heights also can be selected. In some other implementations, indicating which column supports a particular advertisement height can be specified by interacting with one or more drop-down menus with pre-populated options, or one or more data entry tools, such as fields, radio buttons, sliders, or other such graphical user interface widgets.

Store information defining the at least one supported advertisement (520). The information defining the at least one supported advertisement can be stored in association with the publication. The information defining the at least one supported advertisement can be saved in a storage device operatively coupled to a computer system on which a user interface is displayed. Alternatively, the stored information can be shared over a communication network for storing on a remote storage device. The stored information also can be shared with an ad placement service which can synthesize the stored information to provide advertisers, i.e., those looking to purchase a publisher's ad inventory, with a comprehensive database of available ad inventory.

Figure 6:
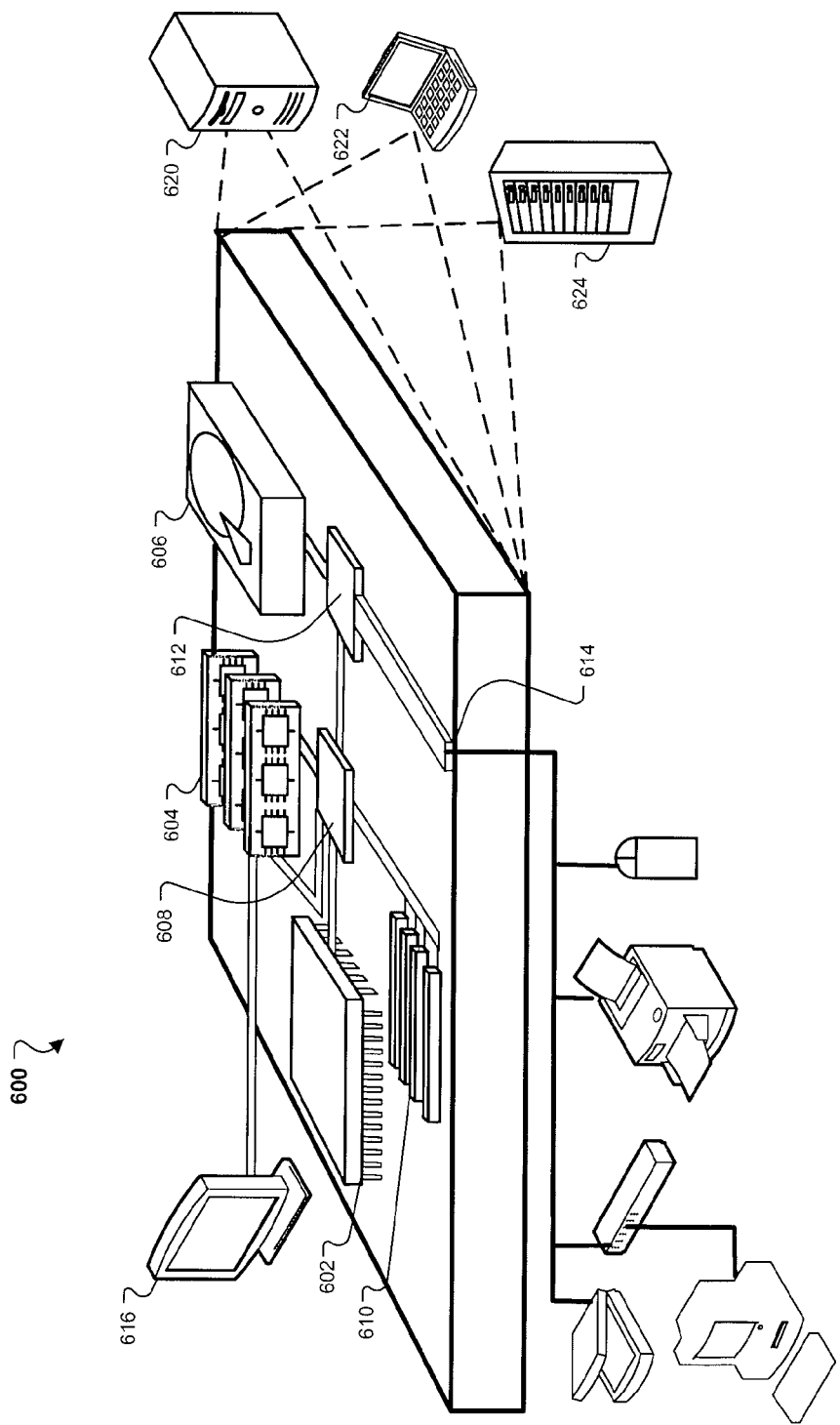
FIG. 6 is a schematic diagram of an example computing device and system that can be used to implement an ad size capture tool for publications.

FIG. 6 is a schematic diagram of an example computing device and system that can be used to implement an ad size capture tool for publications. Computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. Multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. The memory 604 can be a computer-readable medium. The memory 604 can be a volatile memory unit or units. The memory 604 can be a non-volatile memory unit or units.

The storage device 606 is capable of providing mass storage for the computing device 600. The storage device 606 can be a computer-readable medium. The storage device 606 also can be a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can contain instructions that, when executed, perform one or more methods, such as those described above. The information carrier can be a computer- or machine-readable medium, such as the memory 604, the storage device 606, memory on processor 602, or a propagated signal.

The high speed controller 608 can manage bandwidth-intensive operations for the computing device 600, while the low speed controller 612 can manage lower bandwidth-intensive operations. Such allocation of duties is exemplary only. The high-speed controller 608 can be coupled to memory 604, display 616 (e.g., through a graphics processor or accelerator), and to high-speed expansion ports 610, which can accept various expansion cards (not shown). The low-speed controller 612 can be coupled to storage device 606 and low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

A number of implementations have been disclosed herein. Nevertheless, it will be understood that various modifications can be made without departing from the spirit and scope of the claims. For example, the actions recited in the claims can be performed in a different order and still achieve desirable results. Accordingly, other implementations are within the scope of the following claims.

For example, the techniques can be implemented for specifying the sizes of rectangular subcomponents that can be accepted in a two-dimensional object in a wide variety of contexts. The techniques also can be implemented for embedding two-dimensional rectangular objects in a two-dimensional surface.

What is claimed is:

1. A computer-implemented method of receiving information describing advertisements supported by a publication, the method comprising:
    receiving one or more parameters defining a publication, wherein the one or more parameters include one or more of a format, a number of columns, a height and a width;
    presenting, to a publisher, an advertisement inventory table corresponding to the publication, wherein the advertisement inventory table is generated in accordance with the one or more received parameters;
    receiving, from the publisher, input for the advertisement inventory table identifying parameters of advertisements that are acceptable for presentation in the publication, wherein receiving input for the advertisement inventory table comprises receiving input specifying a number of columns of the at least one advertisement that is acceptable for presentation in the publication;
    storing, in the advertisement inventory table, information specifying the parameters of the advertisements that are acceptable for presentation in the publication; and
    providing, to an advertiser, the advertisement inventory table specifying the parameters of the advertisements that are acceptable for presentation in the publication.

2. The method of claim 1, further comprising presenting a publication user interface to receive the one or more parameters defining a publication.

3. The method of claim 1, wherein receiving input for the advertisement inventory table further comprises receiving input specifying a height of the at least one advertisement that is acceptable for presentation in the publication.

4. The method of claim 1, wherein the advertisement inventory table further comprises:
    at least one column specifying an advertisement width; and
    at least one row specifying an advertisement height.

5. The method of claim 4, further comprising receiving, from the publisher, for each column of the advertisement inventory table, input specifying a corresponding advertisement width.

6. The method of claim 4, further comprising receiving, from the publisher, for each row of the advertisement inventory table, input specifying a corresponding advertisement height.

7. The method of claim 1, wherein receiving input for the advertisement inventory table further comprises receiving, from the publisher, input selecting a row-column pair of the advertisement inventory table.

8. A computer program product, encoded on a non-transitory computer-readable medium, operable to cause data processing apparatus to perform operations comprising:
    accepting, from a publisher, one or more parameters defining a publication, wherein the one or more parameters include one or more of a format, a number of columns, a height and a width;
    presenting, to the publisher, an advertisement inventory table corresponding to the publication, wherein the advertisement inventory table is generated in accordance with the one or more accepted parameters;
    accepting, from the publisher, input for the advertisement inventory table identifying parameters of at least one supported advertisement, each supported advertisement being an advertisement that is acceptable for presentation in the publication, wherein accepting input from the publisher for the advertisement inventory table comprises accepting input specifying a number of columns of the at least one supported advertisement;
    storing, in the advertisement inventory table, information specifying the at least one supported advertisement; and
    providing, to an advertiser, the advertisement inventory table specifying the parameters of the at least one supported advertisement for the publication.

9. The computer program product of claim 8, further comprising presenting, to the publisher, a publication user interface for the accepting of the one or more parameters defining a publication.

10. The computer program product of claim 8, wherein accepting, from the publisher, input for the advertisement inventory table further comprises accepting input, from the publisher, specifying a height of the at least one supported advertisement.

11. The computer program product of claim 8, wherein the advertisement inventory table further comprises:
    at least one column specifying an advertisement width; and
    at least one row specifying an advertisement height.

12. The computer program product of claim 11, further operable to cause data processing apparatus to perform operations comprising accepting, from the publisher, for each column of the advertisement inventory table, input specifying a corresponding advertisement width.

13. The computer program product of claim 11, further operable to cause data processing apparatus to perform operations comprising accepting, from the publisher, for each row of the advertisement inventory table, input specifying a corresponding advertisement height.

14. The computer program product of claim 8, wherein accepting input through the advertisement inventory table further comprises accepting, from the publisher, input selecting a row-column pair of the advertisement inventory table.

15. A system comprising:
    a processor; and
    a computer readable medium storing a computer program for receiving information describing advertisements supported by a publication, the computer program comprising instructions to cause the processor to perform operations comprising:
    receiving one or more parameters defining a publication, wherein the one or more parameters include one or more of a format, a number of columns, a height and a width;
    presenting, to a publisher, an advertisement inventory table corresponding to the publication, wherein the advertisement inventory table is generated in accordance with the one or more received parameters;

receiving, from the publisher, input for the advertisement inventory table identifying parameters of advertisements that are acceptable for presentation in the publication, wherein receiving input from the publisher for the advertisement inventory table comprises receiving input specifying a number of columns of the advertisements that are acceptable for presentation in the publication;

storing, in the advertisement inventory table, information specifying the parameters of the advertisements that are acceptable for presentation in the publication; and providing, to an advertiser, the advertisement inventory table specifying the parameters of the advertisements that are acceptable for presentation in the publication.

16. The system of claim 15, wherein the one or more computers comprise a server operable to interact with a user interface device through a data communication network, and the user interface device is operable to interact with the server as a client.

17. The system of claim 15, wherein the one or more computers comprises a personal computer, and the personal computer comprises a user interface device.

18. The system of claim 15, further comprising presenting a publication user interface for the receiving of the one or more parameters defining a publication.

19. The system of claim 15, wherein the advertisement inventory table further comprises:

at least one column specifying an advertisement width; and at least one row specifying an advertisement height.

20. The system of claim 19, the operations further comprising receiving, from the publisher, for each column of the advertisement inventory table, input specifying a corresponding advertisement width.

21. The system of claim 19, the operations further comprising receiving, from the publisher, for each row of the advertisement inventory table, input specifying a corresponding advertisement height.

22. The system of claim 15, wherein receiving, from the publisher, input through the advertisement inventory table further comprises receiving, from the publisher, input selecting a row-column pair of the advertisement inventory table.

23. A system comprising:

a processor; and a computer readable medium storing a computer program for receiving information describing advertisements supported by a publication, the computer program comprising instructions to cause the processor to perform operations comprising:

receiving one or more parameters defining a publication, wherein the one or more parameters include one or more of a format, a number of columns, a height and a width;

presenting, to a publisher, an advertisement inventory table corresponding to the publication, wherein the advertisement inventory table is generated in accordance with the one or more received parameters;

receiving, from the publisher, input for the advertisement inventory table identifying parameters of advertisements that are acceptable for presentation in the publication, wherein receiving, from the publisher, input for the advertisement inventory table comprises receiving, from the publisher, input specifying a number of columns of the at least one supported advertisement;

storing, in the advertisement inventory table, information specifying the parameters of the advertisements that are acceptable for presentation in the publication; and providing, to an advertiser, the advertisement inventory table specifying the parameters of the advertisements that are acceptable for presentation in the publication.

\* \* \* \* \*